US011499825B2

(12) United States Patent
Mocini et al.

(10) Patent No.: US 11,499,825 B2
(45) Date of Patent: Nov. 15, 2022

(54) WEARABLE SLOPE DETECTION SYSTEM

(71) Applicants:Jeffrey Mocini, Melbourne, FL (US);
Rachel Mocini, Melbourne, FL (US)

(72) Inventors: Jeffrey Mocini, Melbourne, FL (US);
Rachel Mocini, Melbourne, FL (US)

( * ) Notice: Subject to any disclaimer, the term of this patent is extended or adjusted under 35 U.S.C. 154(b) by 366 days.

(21) Appl. No.: 16/848,960

(22) Filed: Apr. 15, 2020

(65) Prior Publication Data
US 2020/0240782 A1 Jul. 30, 2020

Related U.S. Application Data

(63) Continuation-in-part of application No. PCT/US2017/062899, filed on Nov. 21, 2017.

(60) Provisional application No. 62/588,421, filed on Nov. 19, 2017.

(51) Int. Cl.
*G01C 9/06* (2006.01)

(52) U.S. Cl.
CPC ...................... *G01C 9/06* (2013.01)

(58) Field of Classification Search
CPC .................... H04B 7/26; G01C 9/06
See application file for complete search history.

(56) References Cited

U.S. PATENT DOCUMENTS

| | | | | |
|---|---|---|---|---|
| 5,450,994 A | * | 9/1995 | Malinowski | ............... A45F 5/02 224/904 |
| 6,059,157 A | * | 5/2000 | Parsons | ................... F41C 33/08 224/245 |
| 6,269,993 B1 | * | 8/2001 | Ebejer | ................... G01B 3/1071 224/269 |
| 7,131,214 B1 | * | 11/2006 | Blackman | ............... A45F 5/021 24/3.11 |
| 7,380,692 B2 | * | 6/2008 | Kostal | ................... F41C 33/041 224/269 |
| 7,602,301 B1 | * | 10/2009 | Stirling | .............. A63B 24/0006 340/573.7 |
| 8,032,324 B1 | * | 10/2011 | Bryant | ................... G01C 17/02 73/504.03 |

(Continued)

FOREIGN PATENT DOCUMENTS

KR 20160002585 A * 8/2016
WO WO-2019099053 A1 * 5/2019 ............. A63B 57/00

*Primary Examiner* — Nimeshkumar D Patel
*Assistant Examiner* — Tania Courson
(74) *Attorney, Agent, or Firm* — Bullock Law; Stephen Bullock

(57) ABSTRACT

Embodiments of the present invention are related to a slope detection system including a sensor with a user midsection clip, an accelerometer, a gyroscope, a short-range communication module, and a portable computing device with display and processor. The processor may include a calibration engine, a slope detection engine, a sensitivity gauge, a conversion engine, and a slope direction calculator.
The calibration engine may be structured to initialize sensor data based on sensor midsection positioning relative to level ground and user movement. The slope detection engine may be structured to calculate slope relative to sensor calibration. The sensitivity gauge may be structured as a user adjustable offset of slope calculation. The conversion engine may be a user adjustable control made to calculate displayed slope in degrees or percentage. Lastly, the slope direction calculator may be structured to determine a left or right slope for display.

18 Claims, 9 Drawing Sheets

(56) References Cited

U.S. PATENT DOCUMENTS

| | | | | |
|---|---|---|---|---|
| 8,172,722 | B2* | 5/2012 | Molyneux | A43B 5/00 |
| | | | | 482/901 |
| 8,694,251 | B2* | 4/2014 | Janardhanan | G01C 21/20 |
| | | | | 701/512 |
| 8,725,452 | B2* | 5/2014 | Han | A61B 5/11 |
| | | | | 702/152 |
| 8,781,610 | B2* | 7/2014 | Han | A63B 24/0021 |
| | | | | 463/20 |
| 8,821,305 | B2* | 9/2014 | Cusey | A63B 69/3608 |
| | | | | 340/539.22 |
| 8,994,827 | B2* | 3/2015 | Mistry | G06F 3/014 |
| | | | | 348/158 |
| 9,062,971 | B2* | 6/2015 | Dutta | G01C 17/02 |
| 9,128,521 | B2* | 9/2015 | Chang | A61B 5/486 |
| 9,320,457 | B2* | 4/2016 | Flaction | A63B 24/0006 |
| 9,349,049 | B2* | 5/2016 | Bentley | A61B 5/6895 |
| 9,641,239 | B2* | 5/2017 | Panther | H04B 7/26 |
| 9,682,305 | B2* | 6/2017 | Kim | A63B 71/0619 |
| 9,855,484 | B1* | 1/2018 | Matak | A61B 5/0022 |
| 9,943,744 | B2* | 4/2018 | Meadows | G01S 5/0045 |
| 10,330,491 | B2* | 6/2019 | Janardhanan | G01C 21/16 |
| 10,334,893 | B2* | 7/2019 | Cobbett | A61B 5/02438 |
| 11,071,902 | B2* | 7/2021 | McCartin | G09B 19/0038 |
| 2013/0207889 | A1 | 8/2013 | Chang | |
| 2016/0354668 | A1* | 12/2016 | Cho | A63B 69/3608 |
| 2017/0108860 | A1 | 4/2017 | Doane et al. | |

* cited by examiner

WEARABLE SLOPE DETECTION SYSTEM

RELATED APPLICATIONS

This is a continuation-in-part application of international application number PCT/US2017/062899 titled Belt-Mounted Slope Sensor System filed on Nov. 21, 2017, which claims the benefit of U.S. provisional patent application No. 62/588,421 filed on Nov. 19, 2017, the entire contents of which are incorporated herein by reference.

FIELD OF THE INVENTION

The present invention relates to systems and methods for detecting ground slope. More particularly, the present invention relates to a wearable slope detection system.

BACKGROUND

In a round of golf, the putter is the most used club for a player. Governing bodies of the game state that an average golfer may score between 98 and 99 with at least 40 putts per round, or 2.2 putts per hole. Professional golfers may average about 1.8 putts per hole and 32 putts per round.

Determining the slope of a putting green to predict where the ball will roll on a putting surface is difficult for golfers of all skill levels. Golfers may try a variety of slope estimation methods including squatting to the ground, using the shaft of the putter as a viewing reference, and walking the putting path to name a few.

These methods are not only inconvenient and inaccurate, but may cause discomfort and health issues for players with limited mobility. Furthermore, the inaccuracy and uncomfortable nature of these methods detract from the enjoyment of the sport and oftentimes slow the pace of the game.

There exists a need in the art for a slope detection system that is easily portable and accurate. Moreover, there exists a need in the art for a wearable slope detection system.

Background information is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to a slope detection system including a sensor with a clip, an accelerometer, a gyroscope, and a short-range communication module. The system may also include a portable computing device with display and user interface, and a processor. The processor may have a calibration engine, a slope detection engine, a sensitivity gauge, a conversion engine, and a slope direction calculator. The accelerometer and gyroscope may detect X, Y and Z sensor positioning data and the short-range communication module may transmit that data to the portable computing device. The sensor may be structured to attach to a user's midsection via the clip.

The calibration engine may be structured to initialize sensor data, defined as sensor calibration, based on sensor midsection positioning relative to level ground and user movement. The slope detection engine may be structured to calculate slope based on X, Y, and Z data captured by the sensor relative to sensor calibration. The sensitivity gauge may be structured as a user adjustable offset of slope calculation based on user preference. The conversion engine may be structured as a user adjustable control to calculate slope for display in degrees or slope displayed as a percentage. The slope direction calculator may be structured to determine a left or right slope whereby the slope and its direction are shown on the display.

In this embodiment, the user display may include a user menu with at least one of a sensor calibration interface, a management interface, a connection interface, a sensitivity gauge bar, and a slope display toggle. Furthermore, the sensor calibration interface may be a user control configured to begin the sensor calibration process and the sensitivity gauge bar may be a user control configured to adjust sensitivity of displayed slope. The slope display toggle may be a user control configured to communicate to the conversion engine a user's desire to display the slope in degrees or percentage. The portable computing device may be at least one of a smart phone, a smart watch, and the sensor and the display may be located thereon.

In this embodiment, the clip may include a clip base with a pair of arched upper securing members comprising upper clip apertures therein. The clip arm of the clip may include undulated edges structured to curve around lower clip apertures. Furthermore, the clip may be removably attached to the sensor rear surface via fasteners secured through the upper clip apertures and lower clip apertures. Lastly, the clip may be structured to tightly secure the sensor in a calibrated position to a user's midsection.

Another embodiment may be a slope detection system including a sensor with a clip, an accelerometer, a gyroscope, and a short-range communication module. The system may also include a display with user interface and a processor. The processor may have a calibration engine, a slope detection engine, a sensitivity gauge, a conversion engine, and a slope direction calculator. The accelerometer and gyroscope may detect X, Y and Z sensor positioning data and the short-range communication module may transmit that data to the processor. The sensor may be structured to attach to a user's midsection via the clip.

The clip may be structured to attach to at least one of a user's belt and waistline garment. The calibration engine may be structured to initialize sensor data, defined as sensor calibration, to determine initial sensor position in radians relative to level ground and user movement. Additionally, the calibration engine may be structured to initialize sensor data by aggregating and averaging raw X, Y and Z data from the sensor. The slope detection engine may be structured to initialize sensor data after it determines that a user is stationary or near stationary. The slope detection engine may also be structured to calculate slope based on X, Y, and Z data captured by the sensor utilizing a YAW angle value and Kalman filter.

In this embodiment the sensitivity gauge may be structured as a user adjustable offset of slope calculation based on user preference. The conversion engine may be structured as a user adjustable control to calculate slope for display in degrees or a percentage. Additionally, the slope direction calculator may be structured to determine a left or right slope whereby the slope and slope direction may be shown on the display.

In this embodiment, the clip may include a clip base with a pair of arched upper securing members comprising upper clip apertures therein. The clip arm of the clip may include undulated edges structured to curve around lower clip apertures. Furthermore, the clip may be removably attached to the sensor rear surface via fasteners secured through the upper clip apertures and lower clip apertures. Lastly, the clip may be structured to tightly secure the sensor in a calibrated position to a user's midsection.

In this embodiment, the slope detection engine may determine if a user is moving by comparing current and previous accelerometer raw Y data against a predetermined stationary value. Furthermore, the slope detection engine may set the gyroscope X value to zero when it determines that the X value is less than zero or the absolute value is less than 0.1. Additionally, the slope detection engine may calculate initial sensor position in radians by calculating a YAW angle value and utilizing a raw angle formula.

In this embodiment, the Kalman filter may be structured to project a slope angle and calculate the difference between the YAW angle value and the projected slope. Furthermore, an estimation error may be calculated utilizing a level ground value of zero and a predetermined constant. This embodiment may include the sensitivity gauge structured to adjust responsiveness of slope determination based on user preference. It may also include the slope direction calculator structured to determine a right to left slope from a negative value and a left to right slope from a positive value.

Another embodiment of the invention may be a slope detection system including a sensor including a clip, an accelerometer structured to detect X, Y and Z sensor positioning data, a gyroscope structure to detect X, Y and Z sensor positioning data, and a short-range communication module configured to transmit sensor X, Y and Z positioning data to a processor. It may also include a display with a user interface, and a processor. The processor may include a calibration engine, a slope detection engine, a sensitivity gauge, a conversion engine, and a slope direction calculator.

This embodiment may have the sensor structured to attach to a user's midsection via the clip. It may also include the calibration engine structured to initialize sensor data, defined as sensor calibration, based on sensor midsection positioning relative to level ground and user movement. The slope detection engine may be structured to calculate slope based on X, Y, and Z data captured by the sensor relative to sensor calibration. Also, the sensitivity gauge may be structured as a user adjustable offset of slope calculation based on user preference. The conversion engine may be structured as a user adjustable control to calculate the slope for display in degrees or a slope displayed as a percentage. Furthermore, the slope direction calculator may be structured to determine a left or right slope whereby the slope and slope direction are shown on the display.

In this embodiment, the display may be located on an upper perimeter surface of the sensor. Furthermore, the sensor may be circular in shape with the clip being removably attached to the sensor rear surface.

DETAILED DESCRIPTION OF THE INVENTION

Figure 1A:
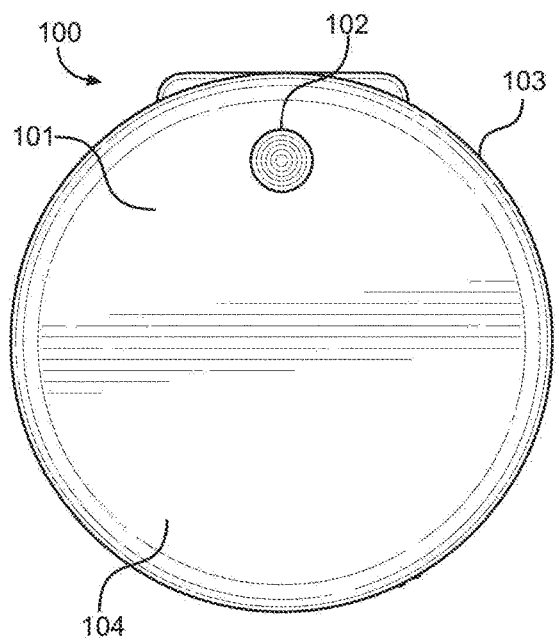
FIG. 1A is a front perspective view of a wearable slope detection sensor according to an embodiment of the invention.
Figure 1B:
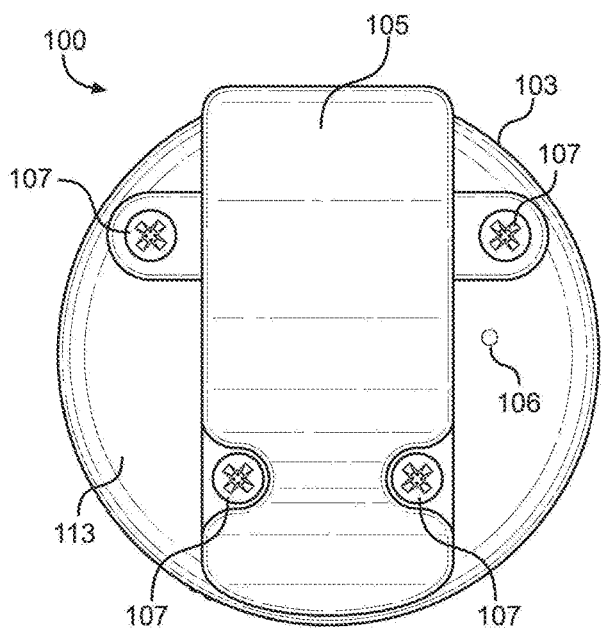
FIG. 1B is a rear perspective view of the wearable slope detection sensor illustrated in FIG. 1A.
Figure 1C:
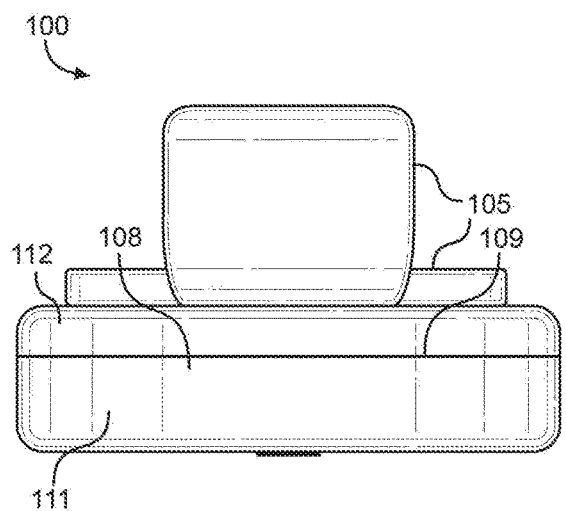
FIG. 1C is a top perspective view of the wearable slope detection sensor illustrated in FIG. 1A.
Figure 1D:
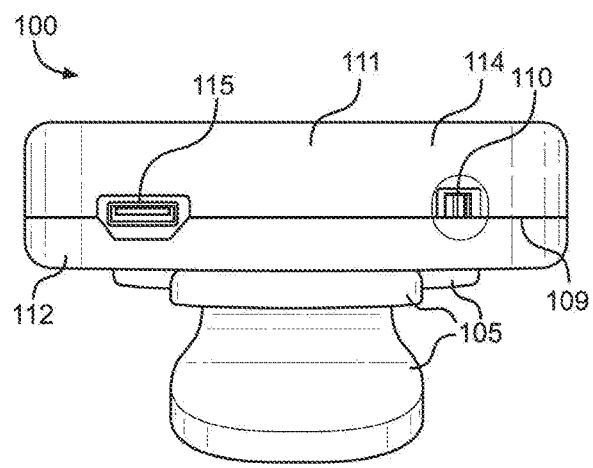
FIG. 1D is a bottom perspective view of the wearable slope detection sensor illustrated in FIG. 1A.
Figures 1E, 1F:
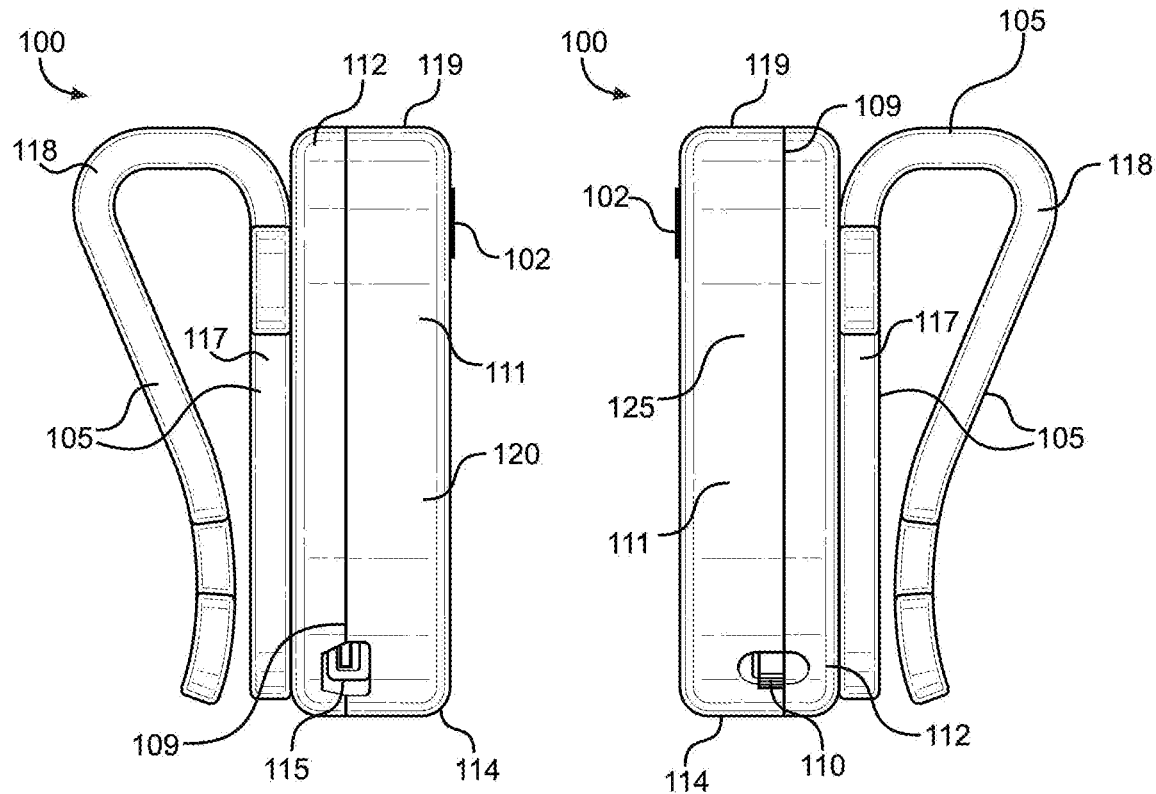
FIG. 1E is a right side perspective view of the wearable slope detection sensor illustrated in FIG. 1A.
FIG. 1F is a left side perspective view of the wearable slope detection sensor illustrated in FIG. 1A.

The present invention will now be described in detail with reference to the accompanying drawings. The embodiment descriptions are illustrative and not intended to be limiting in any way. Other embodiments of the invention wilt readily suggest themselves to persons with ordinary skill in the art after having the benefit of this disclosure. Accordingly, the following embodiments are set forth without any loss of generality and without imposing limitation upon the claimed invention.

Directional terms such as "top" "bottom" "right" "left" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Referring now to FIGS. 1A through 1E, the slope detection system, referenced hereinafter as the system, will be described in more detail. The system may include a sensor 100 with a circular or disc shaped sensor housing 101. While the embodiment described herein is circular, other sensor shapes are contemplated to be within the scope of this application. Such shapes may include oval, square, rectangular, triangular, and polygonal.

The sensor housing 101 may include a perimeter surface 103 that circumscribes the housing 101 to create a circular edge between a front surface 104 and a rear surface 113. The perimeter surface 103 may include an upper perimeter surface 108, a lower perimeter surface 114, a first side perimeter surface 125 and a second side perimeter surface 120. Furthermore, the sensor housing 101 may be bifurcated along the perimeter surface 103 to create a housing first portion 111 and a housing second portion 112. Bifurcated housing 101 may allow for the housing 101 to be divided into two sections and may facilitate access to internal componentry stored within the housing 101. The two sections may be removably engaged via the bisecting junction 109 on the perimeter surface 114.

The front surface 104 may be substantially flat and may include a status indicator 102. The status indicator 102 may be a light that indicates status of the sensor 101. By way of non-limiting examples, a solid red light may indicate that the sensor 100 is initializing. A pulsing red light may indicate that the sensor 100 is transmitting data. A solid green light may indicate that the sensor 100 is connected to at least one of a computing device and processor. A solid blue light may indicate that the sensor 100 is actively transmitting data.

The rear surface 113 may be substantially flat with the exception of a removably engaged clip 105. The clip 105 may be attached to the rear surface 113 via plurality of fasteners 107. Furthermore, the rear surface 113 may include a battery indicator 113. The battery indicator 113 may be a light used to indicate whether the sensor 100 is actively charging its battery when connected to a power source. By way of non-limiting examples, a solid red light may indicate that the sensor 100 battery is charging. An absence of emitted light from the battery indicator 113 may indicate a completed charging process and a fully charged battery.

The lower perimeter surface 114 may include a charging port 115 and a power switch 110. In one embodiment, the charging port 115 may be a USB or micro USB port connected to a battery within the sensor housing 101. A USB cable may be used to connect the sensor 100 to a power source for charging.

Other embodiments may employ different charging methods. By way of non-limiting example, those embodiments may include inductive charging and charging with an AC adapter. However, in any embodiment the power switch 110 to the sensor 100 may be used to connect or disconnect the circuit powering the sensor 100.

The clip 105 may include a clip base 117 that may extend from a lower portion of the sensor 100 to an upper portion of the sensor 100. The clip base 117 may abut, and have a surface that generally conforms to the sensor 100 rear surface 113. A clip arm 118 may extend distally in an arcuate fashion from an upper portion of the clip base 117 before curving back toward the clip base 117 at a lower portion. In some embodiments, the clip arm 117 may then curve slightly away from the clip base 117 at an even lower portion of the clip arm 117.

A side profile of the clip 105 may show a bulbous top portion of the clip 105 with more space between the clip base 117 and clip arm 118 than a lower portion with smaller space between the clip base 117 and clip arm 118. This curvature of the clip arm 118 may facilitate the clip 105 being held onto a belt or garment at a lower end, while looping around and holding a belt or garment waistline in the upper end. The clip 105 may be structured to tightly secure the sensor 100 in a calibrated position to a user's midsection.

Figure 2:
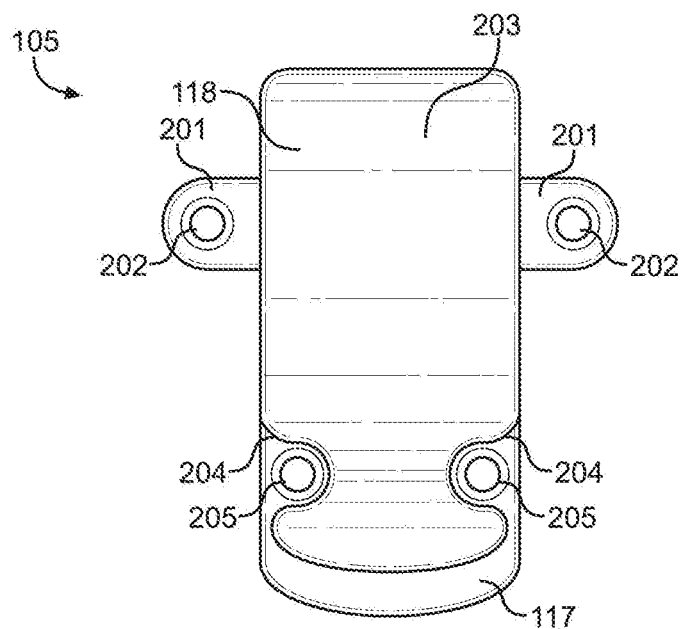
FIG. 2 is a perspective view of a clip attached to the wearable slope detection sensor as illustrated in FIG. 1B.

FIG. 2 shows the clip including a pair of upper securing members 201 with a pair of upper apertures 202 therein. The upper securing members 201 may be arched members extending distally from the clip base 117 perpendicularly.

The upper apertures 202 within the securing members 201 allow for the fasteners 107, for example screws, to assist with removably securing the clip 105 to the sensor 100. Furthermore, a pair of lower apertures 205 may exist on either side of the clip arm 117 at the clip base 118. The outward surface 203 of the clip arm 117 may include undulated edges 204 that curve around the lower apertures 205 to allow for removably securing additional fasteners 107, for example screws, to the arm base 118 therethrough.

Figure 3:
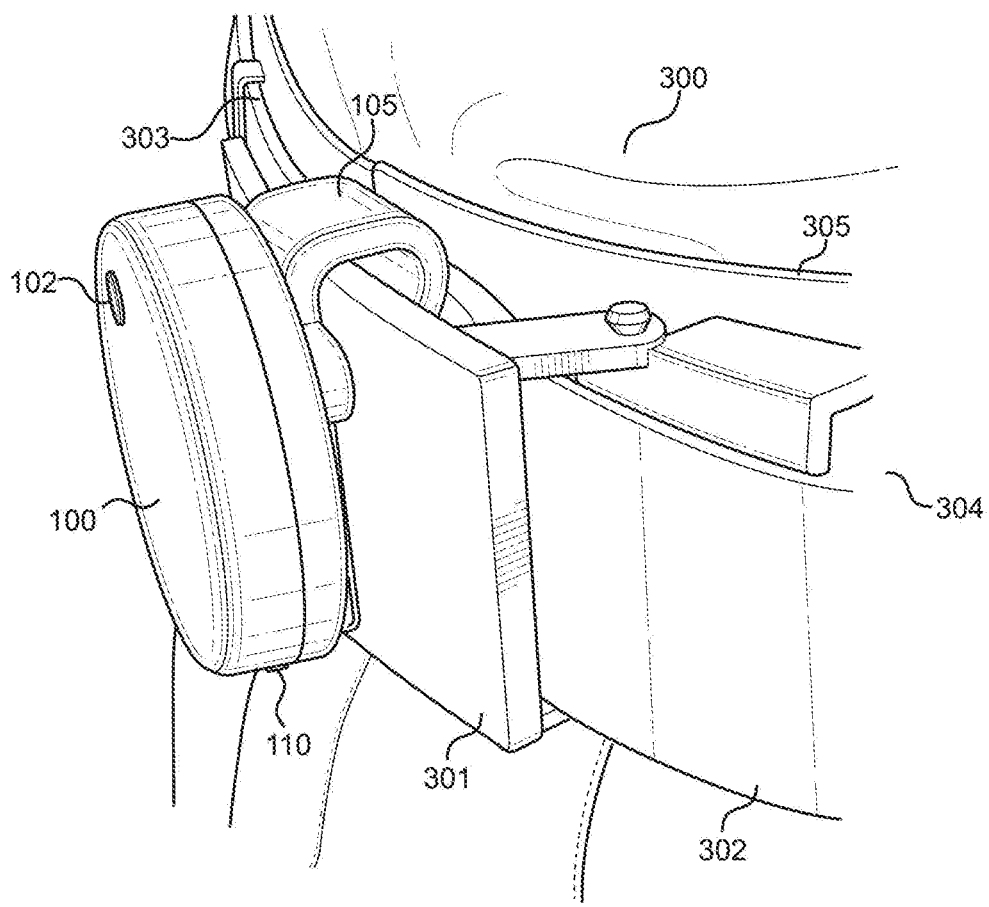
FIG. 3 is an environmental view of the wearable slope detection sensor illustrated in FIG. 1A.

FIG. 3 shows the sensor 100 attached to a user 300 at a user's waist 304 via the clip 305. As illustrated, the clip 305 may removably secure the rear surface 113 of the sensor 100 on a user's belt 302 so that the front surface 104 with status indicator 102 is facing away from the user 300. The clip 305 may extend overtop a user's belt 302 and clip to the belt 302 rear surface. By way of non-limiting example, a user 300 may alternatively use the clip 305 to attach the sensor 100 at a belt upper edge 303 or on a user's 300 garment upper waistline 305 depending on preference. In this embodiment, the sensor 100 is designed to secure to a user's 300 midsection to assist with determining the slope based on hip placement.

Figure 4:
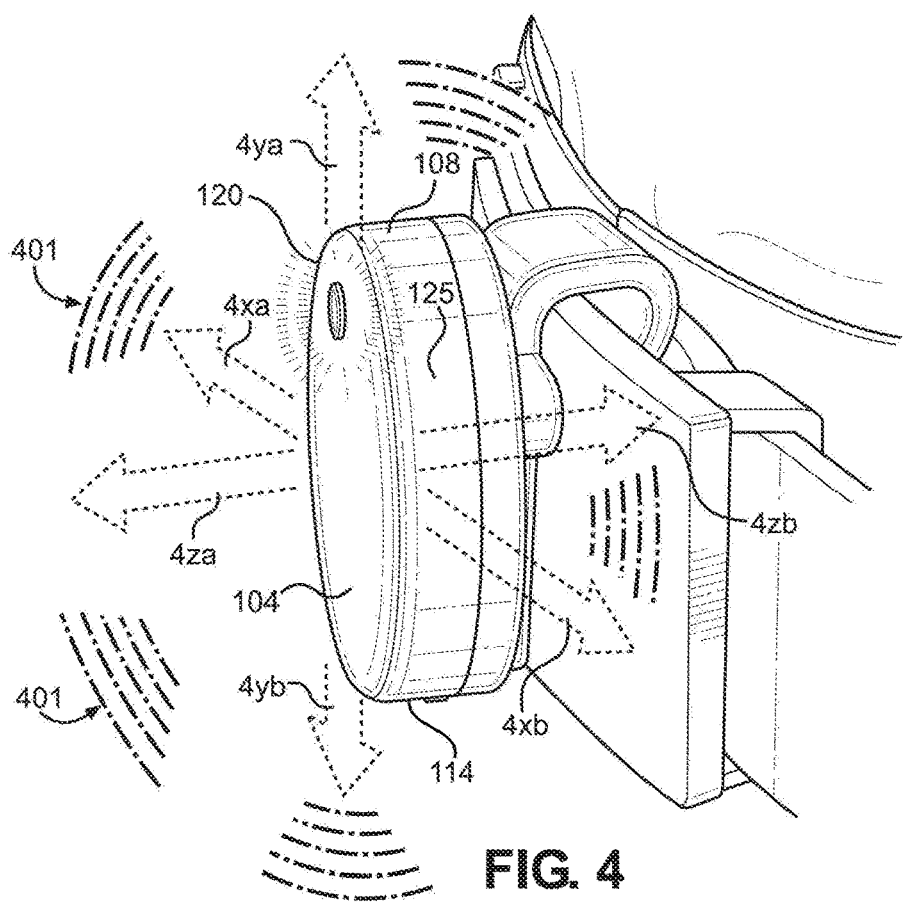
FIG. 4 is an environmental view of the wearable slope detection sensor illustrated in FIG. 1A.

FIG. 4 begins to illustrate functionality of the system. In particular, the sensor 100 may detect sensor positioning data from an X, Y, and Z axis. As will be discussed in more detail hereinafter, X, Y and Z movement data may be collected by an accelerometer and gyroscope within the sensor 100.

The X axis may extend through the sensor 100 first side perimeter surface 125 as shown by 4xa. It may also extend through the second side perimeter surface 120 as shown by 4xb. Horizontal X axis 4xa, 4xb detection may assist the sensor 100 with determining what is level ground relative to sensor 100 positioning. For purposes of this application, horizontal X axis will be referred to as X or 4xa, 4xb.

The Y axis may extend through the sensor 100 upper perimeter surface 108 as shown by 4ya. It may also extend through the lower perimeter surface 114 as shown by 4yb. Vertical Y axis 4ya, 4yb detection may also assist the sensor 100 with determining what is level ground relative to sensor 100 positioning. For purposes of this application, vertical Y axis will be referred to as Y or 4ya, 4yb.

The Y value may demonstrate the forward and backward tilt of a user's 300 midsection. As will be described more fully hereinafter, the system may remove the Y tilt when calculating X to assist with finding an unaffected X value.

Additionally, the Z axis may extend through the sensor 100 front surface 104 as shown by 4za. It may also extend through the rear surface 113 of the sensor 100 as shown by 4zb. For purposes of this application, Z axis will be referred to as Z or 4za, 4zb. The Z value may demonstrate twisting of the user's 300 waistline. As will also be described in more detail hereinafter, the Z may be used in the slope calculation as a part of the Y correction formula when calculating X.

Also shown in FIG. 4 are shortwave communication signals 401 emanating from the sensor 100. The shortwave communication signals 401 may be generated from a short-range communication module used to assist with transmitting data to a central processor. In some embodiments, short-range communication may be by shortwave communication signals 401 and in other embodiments the short-range communication may be via hardwired communication circuitry. In this particular embodiment, the shortwave communication signals 401 are communicating the X, Y, and Z data to a computing device 500 for processing.

Figure 5:
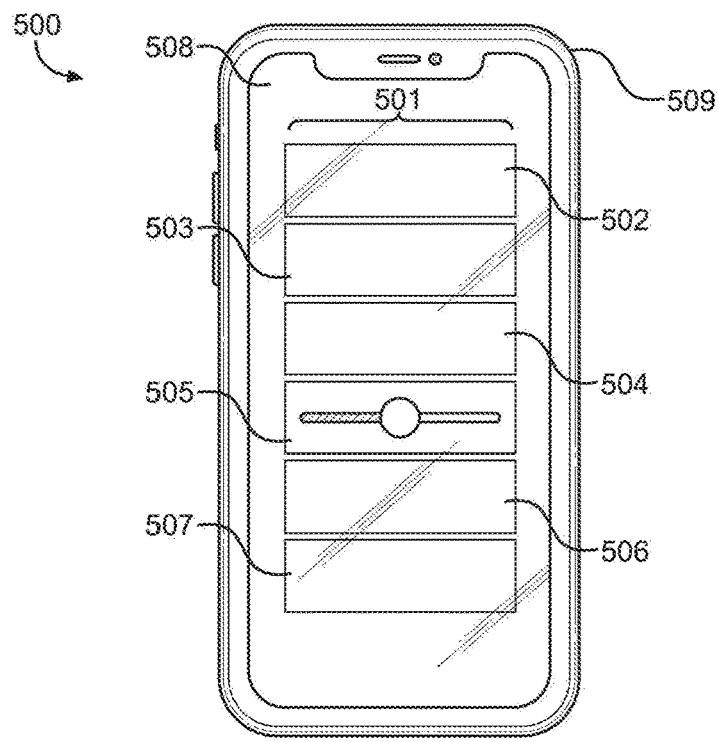
FIG. 5 is a front perspective view of a user interface used with the wearable slope detection system.

FIG. 5 illustrates a computing device 500 that may be used in the system. In this embodiment, the computing device 500 is a smart phone 509 with user display 508 which acts as a user interface as well. The user display 508 may show a user menu 501 used to facilitate communication with both the sensor 100 and a central database. The user menu 501 may include a sensor calibration interface 502, a management interface 503, a connection interface 504, a sensitivity gauge bar 505, a slope display toggle 506 and a clear settings interface 507.

The calibration interface 502 may be a means for a user 300 to begin the process of initializing sensor data, defined as sensor calibration. Sensor calibration, which will be described in more detail hereinafter, involves reading the X, Y, and Z data of the sensor 100 to adjust for the sensor's 100 initial position on a user's waist 304 relative to level ground and user motion.

The management interface 503 may be a means for a user 300 to manage profile information and device registration on a central database. Additionally, the connection interface 504 may allow for a user 300 to switch between smart devices. For example, a user 300 may initially use the sensor 100 with a smart phone 509 but later may switch to a smart watch. In this case, the user 300 may use the connection interface 504 to control the type of computing device 500 being used with the sensor 100.

The sensitivity gauge bar 505 may be a user 300 control designed to adjust a sensitivity gauge. The sensitivity gauge, as will be described hereinafter, may be an adjustable offset of slope calculation based on user preference. Lastly, the user menu 501 may include a clear settings interface 507 designed to place the sensor 100 back to default settings when pressed.

Figure 6:
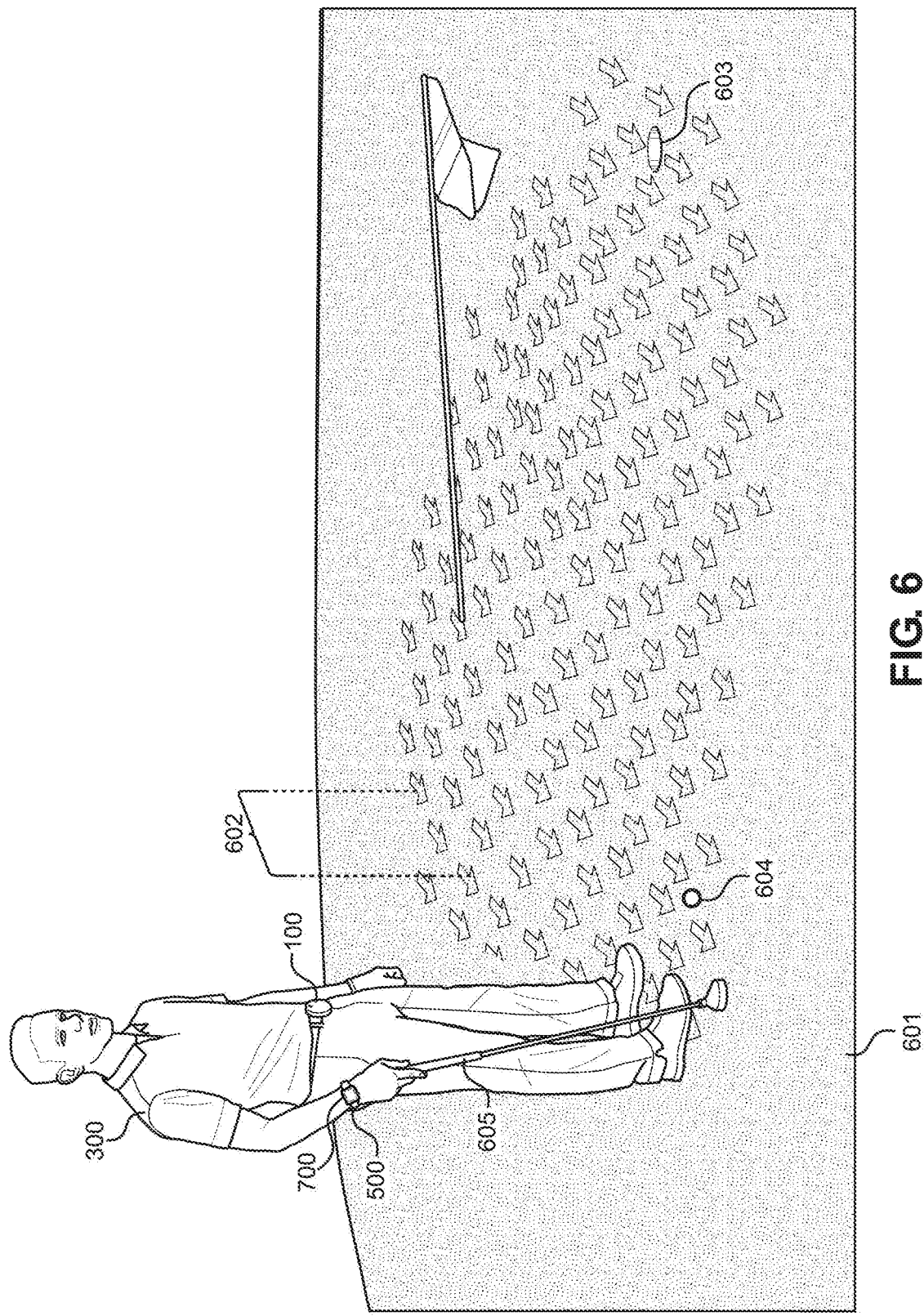
FIG. 6 is an environmental view of the wearable slope detection system.

FIG. 6 is an environmental view of the system as used on a golf course putting green 601. In this embodiment, a user 300 has the sensor 100 attached to his midsection and both the user 100 and the front surface 104 of the sensor 100 are facing a golf putting hole 603. The user 300 is using the system to assist him with determining the angled slope 602 of the putting green 601.

Here, the user 300 is allowing the sensor 100 to read the positioning of his midsection and hips to determine slope. As the arrows illustrate, the angled slope 602 is moving from the user's 300 left to right. This is further demonstrated by the alignment of the user's 300 hips and leg placement on the putting surface 601. Furthermore, as the figure illustrates, the user's 300 left leg is higher than his right leg.

In order to determine how to swing the golf club 605 to hit the golf ball 604 toward or in the hole 603, the user 300 is allowing the sensor 100 to read the placement of his midsection and hips in relation to the placement of the sensor 100 on his waist 304. In this particular embodiment, the user 300 is using a smart watch 700 as his computing device 500 and processor. In other embodiments, the user 300 may elect to use the processor on a smart phone 509 or sensor 100 itself. Once the sensor 100 has taken its readings, and the system has calculated slope, the slope may be displayed.

Figure 7A:
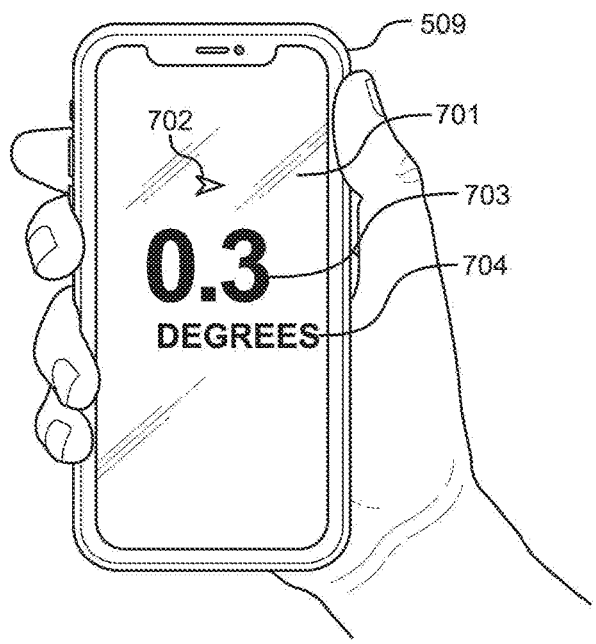
FIG. 7A is a front perspective view of a user display used with the slope detection system according to an embodiment of the invention.
Figure 7B:
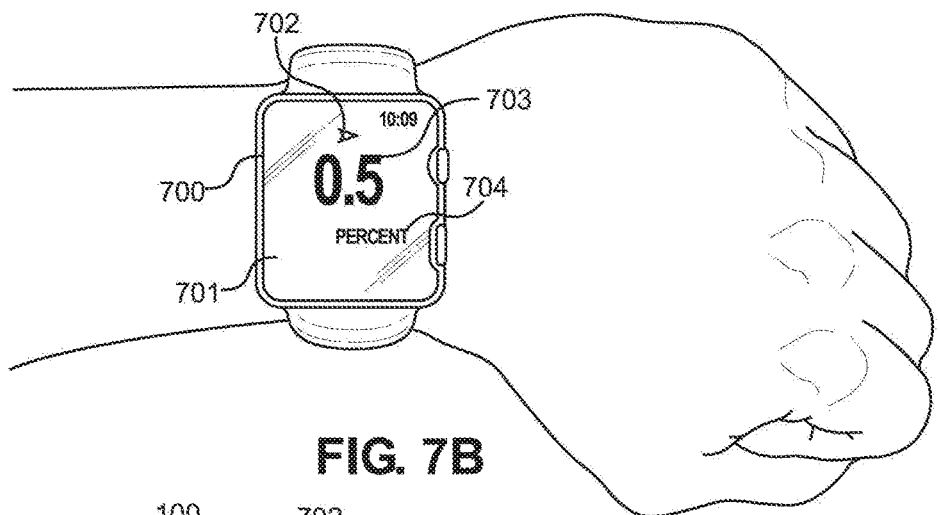
FIG. 7B is a front perspective view of a user display used with the slope detection system according to an embodiment of the invention.
Figure 7C:
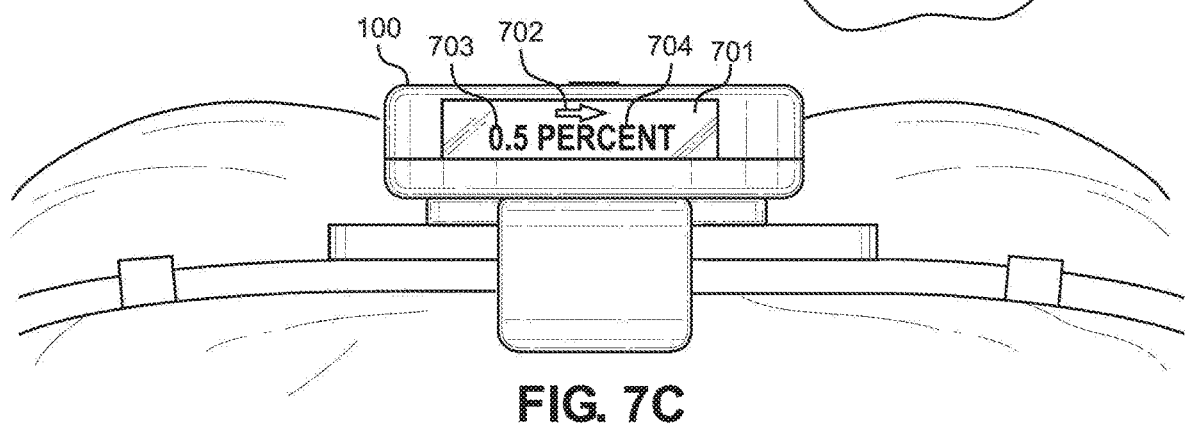
FIG. 7C is a front perspective view of a user display used with the slope detection system according to an embodiment of the invention.

FIGS. 7A through 7C illustrate how the slope may be displayed on a computing device 500. FIG. 7A illustrates a smart phone 509, whereas other embodiments as in 7B and 7C may display slope information on a smart watch 700 or on the sensor 100 itself. However, in any embodiment, the slope may be shown on a slope display 701.

The slope display 701 may include a direction indicator 702 showing the direction of the calculated slope. In all three embodiments shown, the direction indicator 702 is showing the slope as being left to right with an arrow. A calculated numerical display 703 may also be shown indicating the number calculated by the system. Depending on user 300 preference and settings, the numerical display 703 may either be represented as a percentage or in degrees. A mode indicator 704 on the slope display 701 may indicate whether the reading is in degrees or percent.

Figure 8:
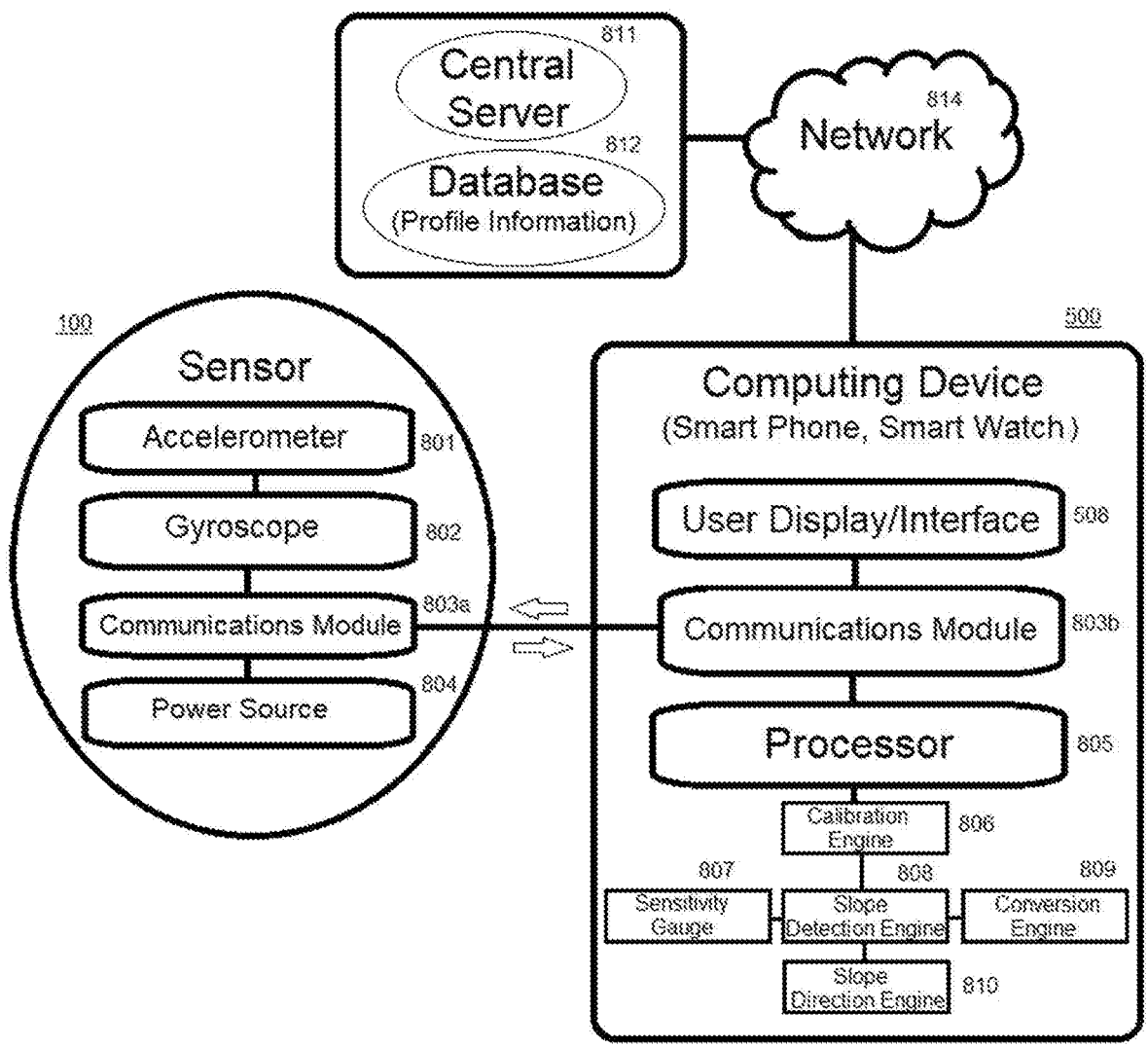
FIG. 8 is a block diagram of the componentry used with the slope detection system according to one embodiment of the invention.

FIG. 8 is a block diagram of the componentry used with the system according to one embodiment of the invention. In this embodiment, the system may include a sensor 100 and a computing device 500 connected via network 814 to a central server 811 and database 812. The database 812 may store information for the system such as user profile information and system registration information.

The internal componentry of the sensor 100 may include an accelerometer 801, a gyroscope 802, a communications module 803a, and a power source 804. The communications module 803a of the sensor 100 may communicate readings to the communications module 803b of the computing device 500. Likewise, the communications module 803b of the computing device 500 may communicate user calibration information to the communications module 803a of the sensor 100.

In this embodiment, a user display with user interface 508 is located on the computing device 500. Also, within the computing device may be a processor 805 including a calibration engine 806, a sensitivity gauge 807, a slope detection engine 808, a conversion engine 809, and a slope direction engine 810.

Figure 8A:
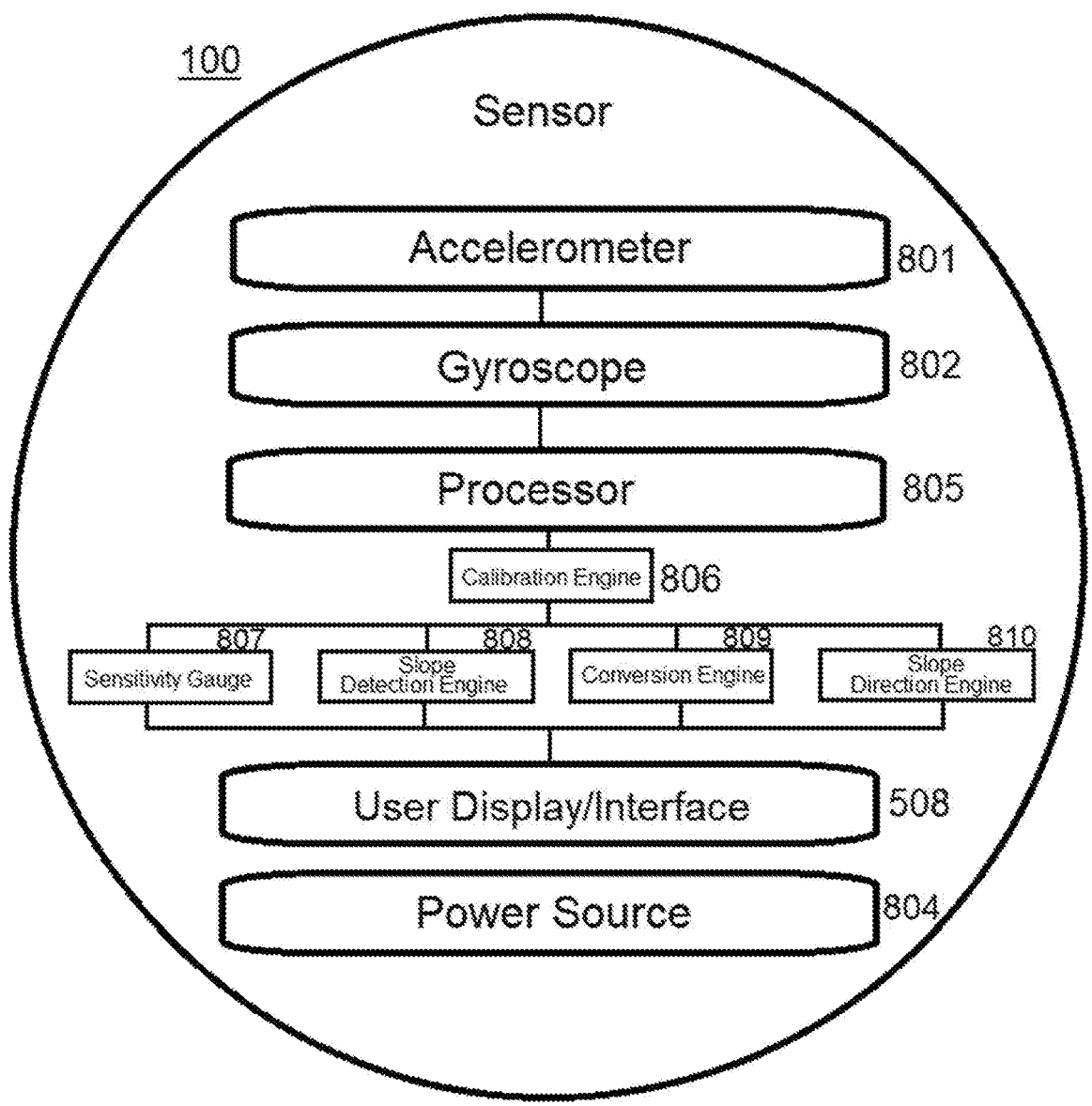
FIG. 8A is a block diagram of the componentry used with the slope detection system according to another embodiment of the invention.

FIG. 8A is a block diagram of another embodiment of the invention whereby the accelerometer 801, the gyroscope 802, the processor 805, the user display with user interface 508, and the power source 804 are all components within the sensor 100. Similar to the embodiment in FIG. 8, the processor 805 may include the calibration engine 806, the sensitivity gauge 807, the slope detection engine 808, the conversion engine 809, and the slope direction engine 810.

Figure 9:
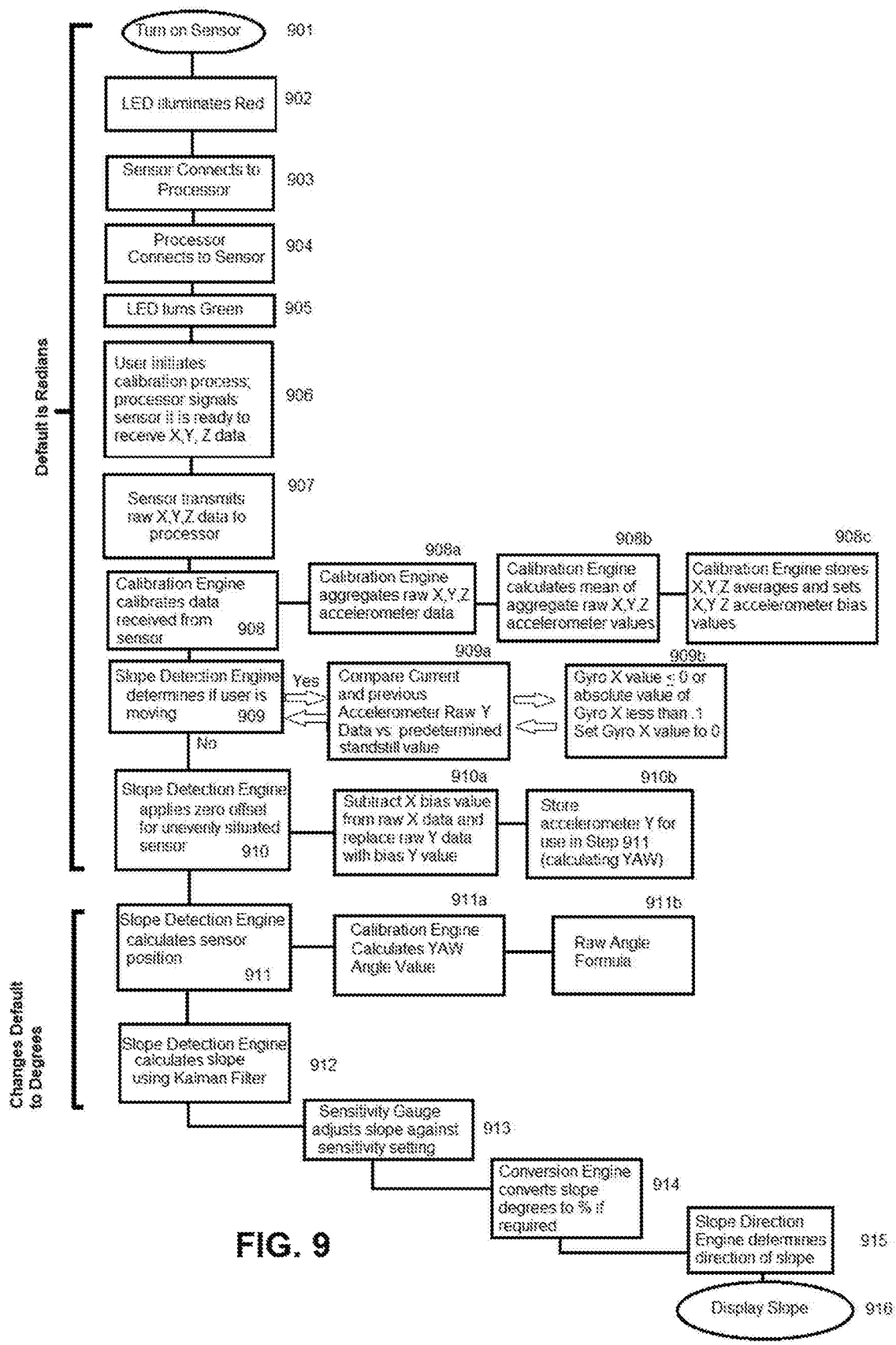
FIG. 9 is a flowchart illustrating the functionality of the slope detection system according to an embodiment of the invention.

FIG. 9 is a flowchart illustrating an overview of the functionality of the system. In one embodiment, a user may turn on the sensor 100 as shown by 901. Once powered on, the status indicator 102 may illuminate red. Block 903 shows that the sensor 100 may connect to the processor 805 within the computing device 500 and the processor 805 may connect to the sensor 100. Both the computing device 500 and the sensor 100 may communicate via a short-range communication module 803a, 803b within each respective component.

In embodiments where the computing device 500 is separate from the sensor 100, communication may be via shortwave communication signals 401 such as Bluetooth®. In embodiments where the processor 805 is located within the sensor 100, communication may be via internal circuitry.

Once a connection is established between the sensor 100 and the processor 805, the status indicator 102 may turn green 905. At this point, a user 300 may initiate the calibration process 906. This may be accomplished by the user 300 clicking the calibration interface 502 on the user menu 501.

Initiating the calibration process 906 signals the sensor 100 that the processor 805 is ready to receive raw X, Y and Z data. At this point, the sensor 100 may begin transmitting the raw X, Y, and Z data to the processor 805 for initial calibration as shown by 907.

The calibration engine 806 within the processor 805 may calibrate the sensor 100 by taking steps as shown by blocks 908a-c. The first step taken by the calibration engine 806 may be for the processor to aggregate the raw X, Y and Z accelerometer data 908a. Raw X, Y, and Z data may be data that comes directly from the sensor 100 without having been altered by calculation or calibration. By way of non-limiting example, aggregation may be thirty (30) values. These values may then be averaged 908b. The averages may be stored for use in setting the biased X, Y and Z accelerometer values 908c. Biased X, Y and Z values are calculated values that account for an unlevel sensor 100 due to the sensors 100 clipped placement on a user's waist 304 or the standing posture of the user as opposed to unlevel ground or slope.

At this point the sensor 100 is calibrated and the processor 805 may begin calculating slope via the slope detection engine 808. The first step performed in the slope calculation process by the slope detection engine 808 is determining if the user 300 is moving 909. This acts as a safety check when calculating slope so that the slope is not prematurely calculated with unreliable information. In some embodiments, the system may prompt a user 300 to stand still before and during slope detection. This movement check of the slope detection engine 808 may account for a user 300 that does not heed that prompt.

The movement check may be done by comparing current accelerometer 801 raw Y data and previous accelerometer 801 raw Y data against a predetermined stationary Y value 909a. In one embodiment, the predetermined stationary value may be 0.04. If the values when compared do not fall within the predetermined stationary Y value range, for example 0.04 or less, then the slope detection engine 808 may determine that the user 300 is moving, and more values may be compared until they fall within the range. If the values fall within the predetermined stationary Y value range, then the slope detection engine 808 may determine that the user is stationary.

A similar movement check may apply to the raw gyroscope X values during the slope detection process. Because gyroscope 802 sensitivity may include miniscule readings that compromise the integrity of slope detection, gyroscope values that hover around 0.1 may be zeroed out. The raw gyroscope X values that are clearly above 0.1 may be used as is. However, if gyroscope X values have an X value that is less than or equal to zero or an absolute value less than 0.1, then they may have their gyroscope X value set to zero, 909b.

Step 910 applies a zero offset to the sensor 100 to account for an unevenly situated sensor 100. In order to account for sensor 100 misalignment, X bias accelerometer values (meaning raw X accelerometer values that have been averaged) may be subtracted from the raw X accelerometer values. Furthermore, the raw Y accelerometer data may be replaced with a bias Y accelerometer value 910a. The newly calculated Y accelerometer value may then be stored for use in the next set of calculations 910b.

Next, the slope detection engine 808 may calculate the sensor 100 position in degrees as shown by box 911. This may be accomplished by calculating the YAW angle value, step 911a, and applying a raw angle formula 911b. The raw angle formula 911b may be represented as $180/\pi$ in Equation 1 below. This raw angle formula 911b may convert sensor 100 readings from radians to degrees so that the readings may easily transition into the Kalman filter.

The YAW angle value may be obtained using the raw accelerometer value of the X coordinate and the raw accelerometer value of the Y coordinate in the following equation:

$$\text{YAW Angle Value} = \text{arctangent (raw accel } X \text{ value}/\text{raw accel } Y \text{ value})*(180/\pi) \qquad \text{Equation 1}$$

Where $(180/\pi)$ represents the raw angle conversion between radians and degrees.

In some embodiments, slope calculation may be accomplished using a Kalman Filter 912. The Kalman filter may project the slope angle to provide an estimate for comparison. That estimated angle may be found by subtracting the X gyroscope values from previously calculated X gyroscope bias values in the last Kalman Filter iteration 912.

The estimated angle calculation may then be multiplied by a sampling period (dt). In one embodiment, the sampling period (dt) may be set at 100 milliseconds. This is because every 100 milliseconds, the position of the sensor 100 may or may not change. This time constant may be used to assist with calculating the estimated slope angle based on whether sensor movement occurred. Since the gyroscope 802 may only measure X value movement per second, this calculation effectively shortens that timeframe. The sampling period (dt) may be used to provide a more accurate slope calculation by eliminating acceleration noise caused by movement within that second. The slope detection engine 808 may accomplish this utilizing the following formula:

$$\text{estmatedAngle} += dt*(\text{gyro}X - \text{prevBias}) \qquad \text{Equation 2}$$

An estimation error covariance may then be calculated to further improve accuracy of the estimated slope. By way of non-limiting example, in one embodiment qAngle may be set to 0.001 and may represent the trust level of the accelerometer 801 readings. Similarly, qBias may be set to 0.003 and may represent the trust level of gyroscope 802 readings. These values represent the constants used to predict the estimation error covariance. The slope detection engine 808 may accomplish this utilizing the following:

$$P[0][0] += dt*(dt*(dt*P[1][1] - P[0][1] - P[1][0] + q\text{Angle})$$

$$P[0][1] -= dt*P[1][1]$$

$$P[1][0] -= dt*P[1][1]$$

$$P[1][1] += q\text{Bias}*dt; \qquad \text{Equation 3}$$

The slope detection engine 808 may calculate the angle difference between an estimated angle and the actual angle by using the calculated YAW angle value and subtracting the calculated estimated angle as follows:

$$\text{angleDifference} = \text{yawAngleValue} - \text{estimatedAngle} \qquad \text{Equation 4}$$

The slope detection engine 808 may calculate an estimation error rate. This may be done using P[0][0] from the estimation error covariance vector matrix in Equation 3 and a standard deviation constant, rMeasure, which by non-limiting example may be set to 0.03. A person having ordinary skill in the art will appreciate that the rMeasure value may represent an overall estimation trust level and may be adjusted. The estimation error rate may be accomplished using the following formula:

$$\text{estimationError} = P[0][0] + r\text{Measure} \qquad \text{Equation 5}$$

A Kalman gain may be calculated utilizing a 2×1 vector that determines and updates the estimation error covariance described in Equation 3. This may be done with the following formula:

$$\text{KalmanGain}[0] = P[0][0]/\text{estimationError}$$

$$\text{KalmanGain}[1] = P[1][0]/\text{estimationError} \qquad \text{Equation 6}$$

Now the estimated angle and previous bias may be updated by adding the product of the Kalman gain vector and the angle difference calculated in Equation 4. This may be accomplished as follows:

estimatedAngle+=KalmanGain[0]*angleDifference prevBias+=KalmanGain[1]*angleDifference  Equation 7

The estimation error covariance may then be decreased by using the same vector from Equation 6. This is because the estimation error has also now decreased. This estimation error covariance decrease may be calculated by the following:

previousP00Value=P[0][0]

previousP01Value=P[0][1]

P[0][0]−=KalmanGain[0]*previousP00Value

P[0][1]−=KalmanGain[0]*previousP01Value

P[1][0]−=KalmanGain[1]*previousP00Value

P[1][1]−=KalmanGain[1]*previousP01Value  Equation 8

The slope detection engine 808 may continue calculating the slope until it determines that there is a plurality of slope values that have been calculated while the user 300 is within the stationary range. By way of non-limiting example, this amount may be five (5) slope values calculated while the user is determined to be stationary as compared against the predetermined stationary value range. Once the slope detection engine 808 calculates five (5) slope values within the predetermined stationary value range, then it may average those values to create one slope measurement. In some embodiments, this slope measurement may be delivered in degrees by default.

This delivered slope measurement may be evaluated against a previously calculated slope. If the slopes match, then a consecutive slope counter may be incremented by 1. If the values do not match then the consecutive slope counter may be reset to 0. By way of non-limiting example, once the consecutive slope counter reaches a predetermined value such as 3, then the slope calculation process may terminate and the matched slope measurement may be ready for display as the calculated slope.

However, once a matched slope measurement has been calculated, the sensitivity gauge 807 may adjust the slope measurement against a sensitivity setting chosen by the user 300, as shown by box 913. By way of non-limiting example, slope measurement may be multiplied by a sensitivity factor between 0.1 and 1.0. The sensitivity gauge 807 may allow for a user 300 of varying lateral hip mobility to adjust the range of motion needed to accurately calculate the slope from their stance. By way of non-limiting example, an adjustment closer to 0.1, as managed by the sensitivity gauge bar 505, may indicate a user's 300 preference for a less sensitive slope reading. An adjustment closer to 1.0, as managed by the sensitivity gauge bar 505, may indicate a user's 300 preference for a more sensitive slope reading.

If a user 300 has chosen to display the slope as a percentage, the conversion engine 809 may convert the slope accordingly, as shown by box 914. This may be accomplished using the following formula:

Adjusted slope percentage=Absolute value of (tangent (round(adjusted slope measurement×100)/100*($\pi$/180))*100  Equation 9

The slope measurement may be rounded to the nearest half and the tangent of the rounded slope measurement may be multiplied by ($\pi$/180). This product may be multiplied by 100 to display the slope measurement value as a true percentage instead of degrees.

The slope direction engine 810 may determine the direction of the slope 915 to be displayed 916. The direction of the slope is determined using the slope measurement calculated by the slope detection engine 808. If the resulting value is positive, then the displayed direction of the slope is left to right. If the resulting value is negative, then the displayed direction of the slope is right to left.

That which is claimed is:

1. A slope detection system comprising
   a sensor comprising
      a clip,
      an accelerometer configured to detect X, Y and Z sensor positioning data,
      a gyroscope configured to detect X, Y and Z sensor positioning data, and
      a short-range communication module configured to transmit sensor X, Y and Z positioning data to a portable computing device; and
   a portable computing device comprising
      a display with user interface,
      a processor comprising
         a calibration engine,
         a slope detection engine,
         a slidable sensitivity bar,
         a conversion engine, and
         a slope direction calculator;
   wherein the sensor is configured to attach to a user's midsection via the clip;
   wherein the sensor is circular in shape and the clip is removably attached to a sensor rear surface;
   wherein the slidable sensitivity gauge bar is a user adjustable offset of slope based on user preference;
   wherein the calibration engine is configured to initialize sensor data, defined as sensor calibration, based on sensor midsection positioning relative to level ground and user movement;
   wherein the slope detection engine is configured to calculate slope based on X, Y, and Z data captured by the sensor relative to sensor calibration;
   wherein the sensitivity gauge is configured as a user adjustable offset of slope calculation based on user preference;
   wherein the conversion engine is configured as a user adjustable control to calculate slope for display in degrees or slope displayed as a percentage;
   wherein the slope direction calculator is configured to determine a left or right slope; and
   wherein the slope and slope direction are shown on the display.

2. The slope detection system of claim 1 wherein the user display comprises a user menu with at least one of a sensor calibration interface, a management interface, a connection interface, a sensitivity gauge bar, and a slope display toggle.

3. The slope detection system of claim 2 wherein the sensor calibration interface is a user control configured to begin the sensor calibration process.

4. The slope detection system of claim 2 wherein the sensitivity gauge bar is a user control configured to adjust sensitivity of displayed slope.

5. The slope detection system of claim 2 wherein the slope display toggle is a user control configured to communicate to the conversion engine a user's desire to display the slope in degrees or percentage.

6. The slope detection system of claim 1 wherein the portable computing device is at least one of a smart phone, a smart watch, and the sensor.

7. The slope detection system of claim 1 wherein the display is located on at least one of a smart phone, a smart watch, and the sensor.

8. The slope detection system of claim 1 wherein the clip comprises a clip base with a pair of arched upper securing members comprising upper clip apertures therein; and wherein a clip arm of the clip comprises undulated edges configured to curve around lower clip apertures; and wherein the clip is removably attached to the sensor rear surface via fasteners secured through the upper clip apertures and lower clip apertures; and wherein the clip is configured to tightly secure the sensor in a calibrated position to a user's midsection.

9. A slope detection system comprising
a sensor comprising
a clip;
an accelerometer configured to detect X, Y and Z sensor movement data,
a gyroscope configured to detect X, Y and Z sensor positioning data, and
a short-range communication module configured to transmit sensor X, Y and Z positioning and movement data to a processor;
a display with user interface, and
a processor comprising
a calibration engine,
a slope detection engine,
a slidable sensitivity gauge bar,
a conversion engine, and
a slope direction calculator;
wherein the clip is configured to attach to at least one of a user's belt and waistline garment,
wherein the sensor is circular in shape and the clip is removably attached to a sensor rear surface;
wherein the slidable sensitivity gauge bar is a user adjustable offset of slope based on user preference;
wherein the calibration engine is configured to initialize sensor data, defined as sensor calibration, to determine initial sensor position in radians relative to level ground and user movement;
wherein the calibration engine is configured to initialize sensor data by aggregating and averaging raw X, Y and Z data from the sensor;
wherein the slope detection engine is configured to initialize sensor data after it determines that a user is stationary or near stationary;
wherein the slope detection engine is configured to calculate slope based on X, Y, and Z data captured by the sensor utilizing a YAW angle value and Kalman filter;
wherein the sensitivity gauge is configured as a user adjustable offset of slope calculation based on user preference;
wherein the conversion engine is configured as a user adjustable control to calculate slope for display in degrees or slope displayed as a percent;
wherein the slope direction calculator is configured to determine a left or right slope; and
wherein the slope and slope direction are shown on the display.

10. The slope detection system of claim 9 wherein the clip comprises a clip base with a pair of arched upper securing members comprising upper clip apertures therein; and wherein a clip arm of the clip comprises undulated edges configured to curve around lower clip apertures; and wherein the clip is removably attached to the sensor rear surface via fasteners secured through the upper clip apertures and lower clip apertures; and wherein the clip is configured to tightly secure the sensor in a calibrated position to a user's midsection.

11. The slope detection system of claim 9 wherein the slope detection engine determines if a user is moving by comparing current and previous accelerometer raw Y data against a predetermined stationary value.

12. The slope detection system of claim 9 wherein the slope detection engine sets the gyroscope X value to zero when it determines that the X value is less than zero or the absolute value is less than 0.1.

13. The slope detection system of claim 9 wherein the slope detection engine calculates initial sensor position in radians by calculating a YAW angle value and utilizing a raw angle formula.

14. The slope detection system of claim 9 wherein the Kalman filter is configured to project a slope angle and calculate the difference between the YAW angle value and the projected slope.

15. The slope detection system of claim 14 wherein an estimation error is calculated utilizing a level ground value of zero and a predetermined constant.

16. The slope detection system of claim 9 wherein the slope direction calculator determines a right to left slope from a negative value and a left to right slope from a positive value.

17. A slope detection system comprising
a sensor comprising
a clip,
an accelerometer configured to detect X, Y and Z sensor positioning data,
a gyroscope configured to detect X, Y and Z sensor positioning data, and
a short-range communication module configured to transmit sensor X, Y and Z positioning data to a processor;
a display with a user interface, and
a processor comprising
a calibration engine,
a slope detection engine,
a slidable sensitivity gauge bar,
a conversion engine, and
a slope direction calculator;
wherein the sensor is configured to attach to a user's midsection via the clip;
wherein the sensor is circular in shape and the clip is removably attached to a sensor rear surface;
wherein the slidable sensitivity gauge bar is a user adjustable offset of slope based on user preference;
wherein the calibration engine is configured to initialize sensor data, defined as sensor calibration, based on sensor midsection positioning relative to level ground and user movement;
wherein the slope detection engine is configured to calculate slope based on X, Y, and Z data captured by the sensor relative to sensor calibration;
wherein the sensitivity gauge is configured as a user adjustable offset of slope calculation based on user preference;
wherein the conversion engine is configured as a user adjustable control to calculate the slope for display in degrees or a slope displayed as a percentage;
wherein the slope direction calculator is configured to determine a left or right slope; and
wherein the slope and slope direction are shown on the display.

18. The slope detection system of claim 17 wherein the display is located on an upper perimeter surface of the sensor.

\* \* \* \* \*